(No Model.) 5 Sheets—Sheet 1.
S. D. MADDIN.
HARVESTER.
No. 382,049. Patented May 1, 1888.
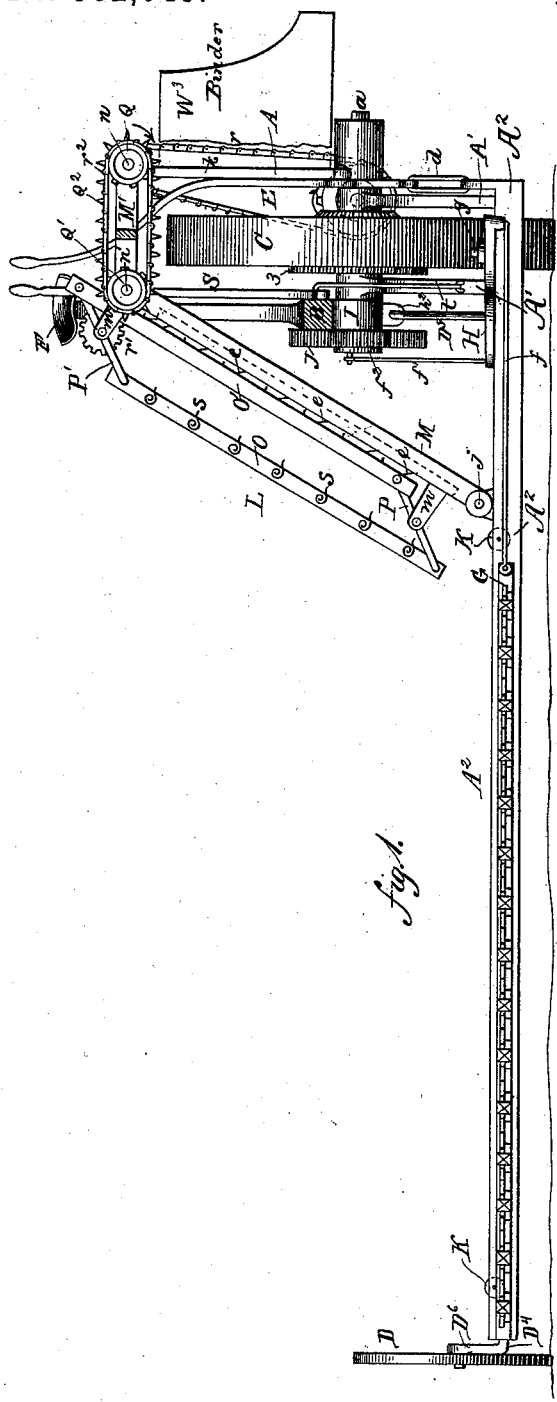
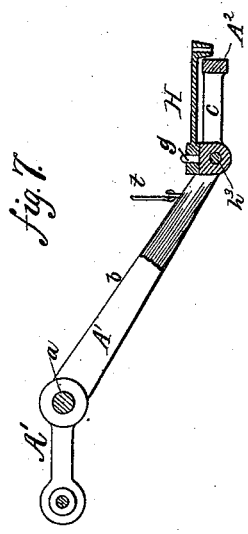
Witnesses:
Inventor:
S. D. Maddin.

(No Model.) 5 Sheets—Sheet 2.
S. D. MADDIN.
HARVESTER.
No. 382,049. Patented May 1, 1888.
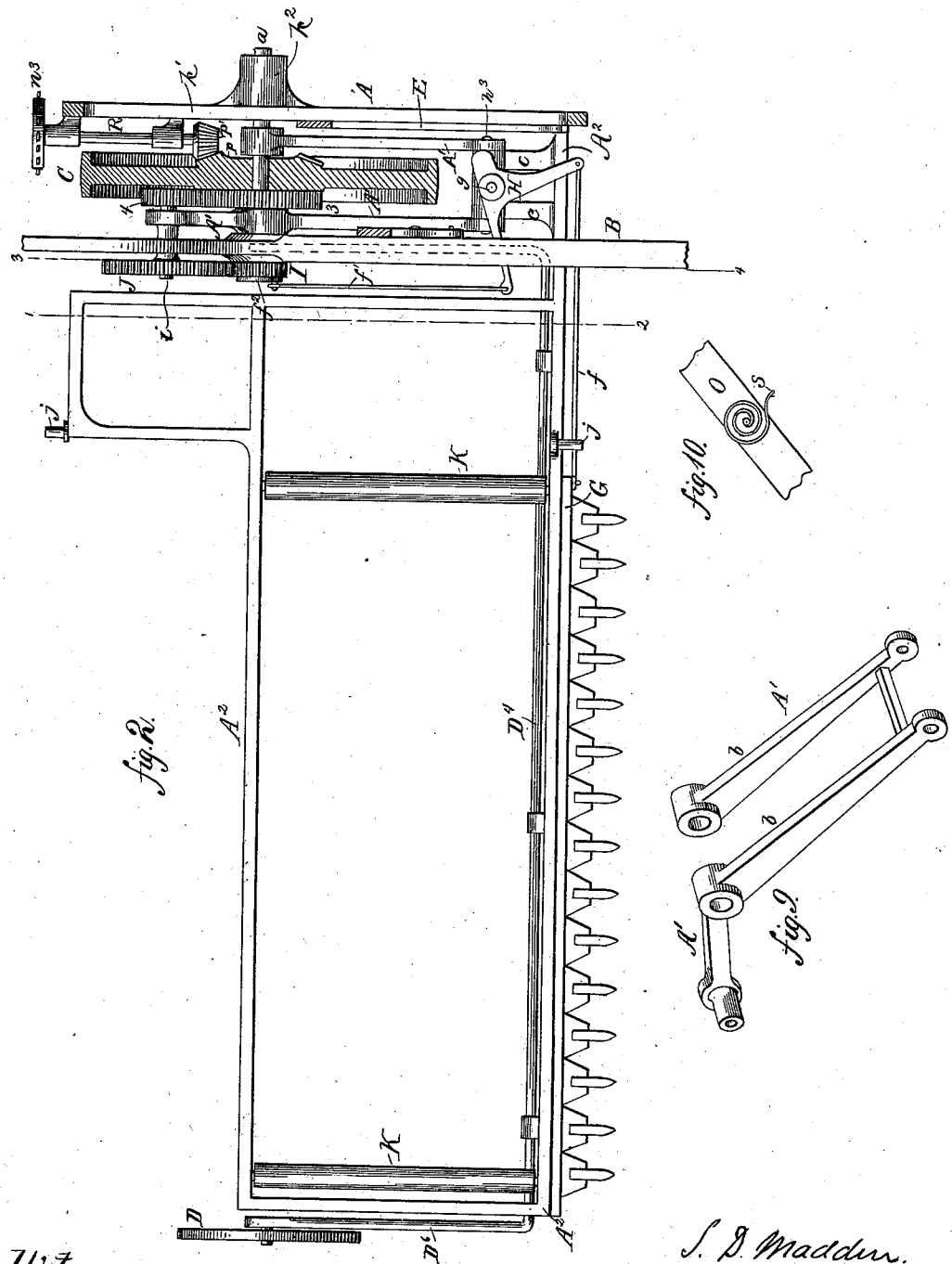

(No Model.) 5 Sheets—Sheet 3.
S. D. MADDIN.
HARVESTER.
No. 382,049. Patented May 1, 1888.
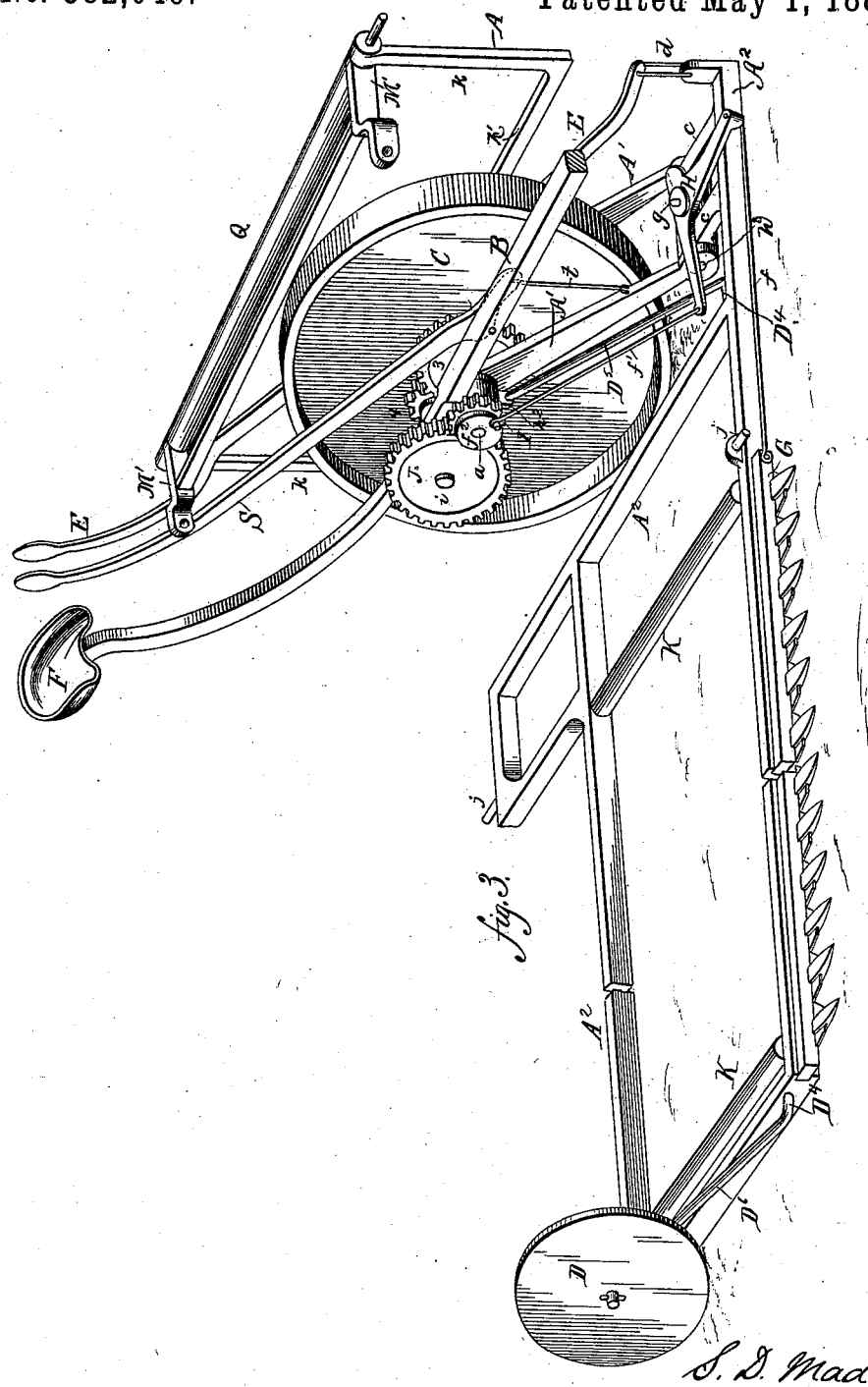

(No Model.) 5 Sheets—Sheet 4.
S. D. MADDIN.
HARVESTER.
No. 382,049. Patented May 1, 1888.
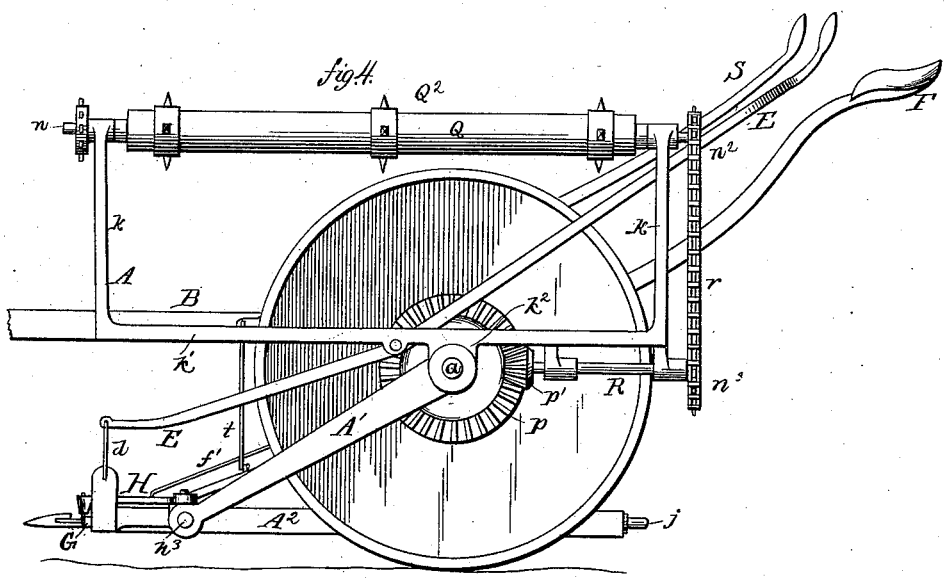
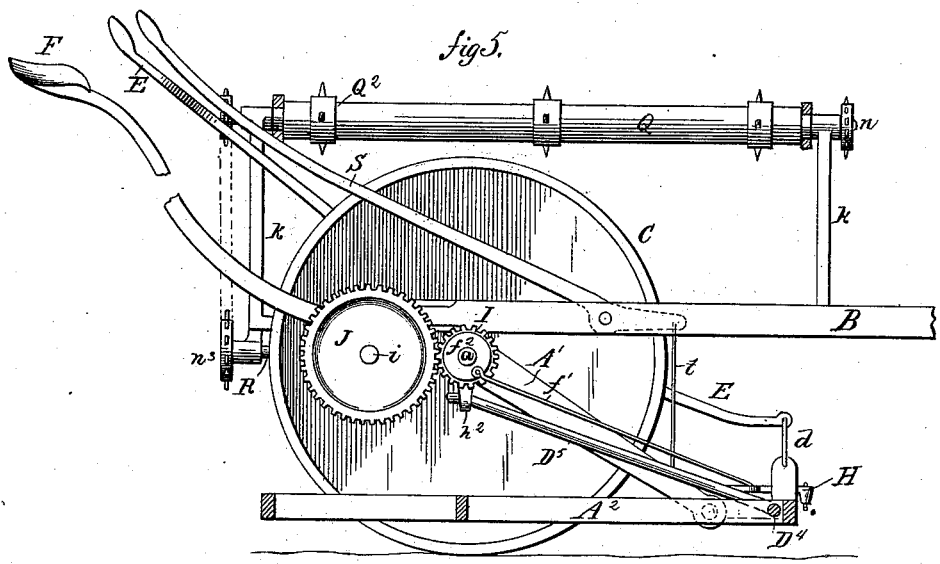
Witnesses:
John J. Hinkel
A. E. Hansmann.
S. D. Maddin.
Inventor:
By Foster & Freeman
Atty.

(No Model.) 5 Sheets—Sheet 5.

S. D. MADDIN.
HARVESTER.

No. 382,049. Patented May 1, 1888.

UNITED STATES PATENT OFFICE.

SAMUEL D. MADDIN, OF MIAMISBURG, OHIO, ASSIGNOR TO MARY MADDIN, OF SAME PLACE.

HARVESTER.

SPECIFICATION forming part of Letters Patent No. 382,049, dated May 1, 1888.

Application filed May 2, 1884. Serial No. 130,110. (No model.)

*To all whom it may concern:*

Be it known that I, SAMUEL D. MADDIN, a citizen of the United States, residing at Miamisburg, in the county of Montgomery and State of Ohio, have invented certain new and useful Improvements in Harvesters, of which the following is a specification.

My invention is a harvester in which three frames are connected and combined with each other and with adjusting appliances, as fully described hereinafter, so as to support the whole mainly upon a single driving-wheel and permit a ready and perfect adjustment of the platform to any desired position without interfering with the movements, the machine being free from complexity and capable of ready manipulation.

Figure 6:
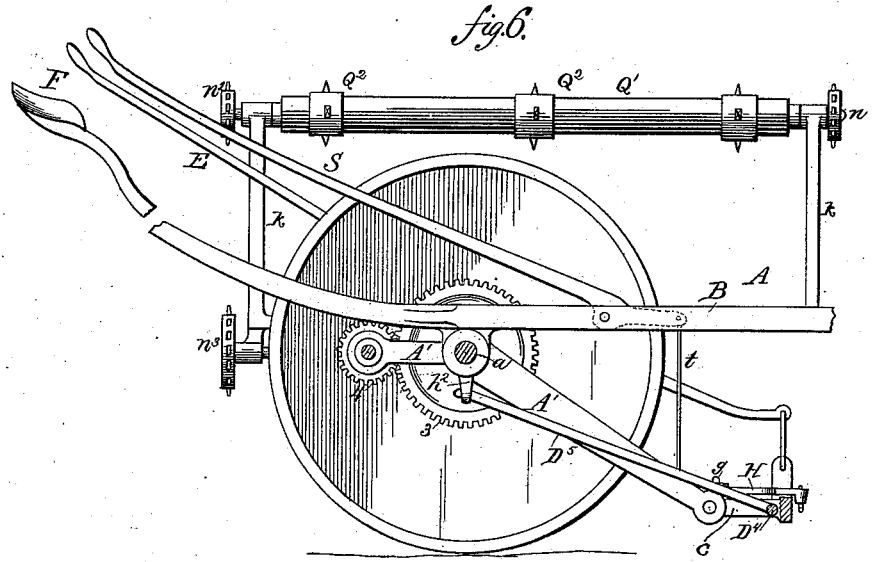
Figure 8:
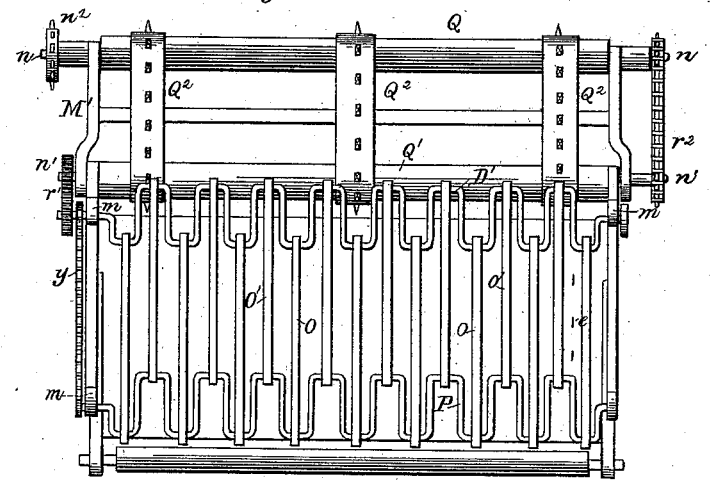

In the drawings, Figure 1 is a front elevation of my improved harvester. Fig. 2 is a plan partly in section. Fig. 3 is a perspective view of part of the machine. Fig. 4 is an end elevation of the stubble side. Fig. 5 is a sectional elevation on the line 1 2, Fig. 2, the elevator-frame being omitted. Fig. 6 is a vertical section on the line 3 4, Fig. 2. Fig. 7 is a side elevation of the connecting-frame. Fig. 8 is a plan view of the elevator-frame and connections. Fig. 9 is a perspective view of the connecting-frame. Fig. 10 is a detached view of part of one of the toothed elevator-bars.

The machine is supported by two wheels, C D, the wheel C being the main supporting and driving wheel, and the wheel D being the grain-wheel. There are three frames, A, A', and A², supported by said wheels, and upon which all the other parts of the machine rest. The main frame A has its bearing upon the axle $a$ of the driving-wheel C, and consists of a horizontal bar, $k'$, having a hub, $k^2$, for said bearing, and standards $k$, extending vertically therefrom, and the pole B is connected to the axle, as shown, or to the main frame A, which in the latter case is maintained thus in substantially a horizontal position. The frame A, as herein shown, is held in a substantially horizontal position by connections with the elevator-frame, as will hereinafter appear, and the frame A' is hung to and swings upon the axle $a$, and is formed by two side bars, $b\, b$, which at their forward ends are jointed by a bolt, $h^3$, to a bracket, $c$, upon the platform-frame A², the latter being supported at its outer end by the grain-wheel D, and its inner end being suspended by a link, $d$, to the end of a lever, E, pivoted to the main frame A and extending to a position adjacent to the driver's seat F, supported, as shown, by the pole. A rod or rockshaft, D⁴, turns in bearings upon the platform-frame A², and is provided with an inner arm, D⁵, which extends through a bearing, $h^2$, on the pole B, and at the outer end is provided with an arm, D⁶, which carries the journal of the grain-wheel D. When the lever E is operated to raise or lower the inner end of the platform-frame A², the contact of the arm D⁵ with its stationary bearing will cause the rock-shaft D⁴ to be turned so as to maintain the wheel D in contact with the ground, so that the single movement raises or lowers both ends of the platform-frame A² simultaneously and maintains the horizontal position of the said frame.

The pivotal connection of the frames A' and A² at $h^3$ permits the vertical adjustment of the latter frame, and at the same time maintains a positive relation of the frame A² and the axle of the wheel C, so that the side of the wheel is always parallel with that of the frame, and so that the connections hereinafter described between the knife-bar and driving-wheel do not vary with the change in position of the connected parts.

The cutters are carried at the forward edge of the platform-frame A², which normally occupies a position near to the ground, the cutter-bar G sliding in suitable bearings and being connected by a rod, $f$, to one arm of a bell-crank lever, H, pivoted by a pin, $g$, to the bracket $c$, the other arm being connected by a pitman, $f'$, to a crank-wheel, $f^2$, which is carried by a pinion, I, rotating on the axle $a$.

The pinion I is driven from a gear, 3, upon the wheel C, which meshes with a pinion, 4, upon a shaft, $i$, carried by an arm of the frame A', and carrying a gear-wheel, J, which meshes with the said pinion I. By this means the rotation of the wheel C imparts a rapid revolution to the crank-wheel $f^2$, whereby the lever H is vibrated and the cutter-bar is reciprocated, the movement being continued whatever may be the height of the platform-frame A², inasmuch as the elevation or depression of the latter does not materially change the relative position of the centers through which motion is communicated from the wheel C to the cutter-bar.

The platform-frame A² is provided with the usual rollers, K K, around which the canvas travels, carrying the grain toward an elevator, L, Fig. 1.

The inclined portion or frame M of the elevator is pivoted to studs $j$ upon the frame A², and at the upper end is pivoted to a frame, M', which is jointed at the opposite side to standards $k$ $k$ of the main frame A, the elevator-frame thus consisting of an inclined portion, M, and a substantially-horizontal portion, M', which extends over the wheel C, so that the grain is lifted over the latter to the outside of the machine or to the binder, in position shown by lines W³, the jointed character of the elevator-frame permitting the vertical position of the platform-frame A² to be varied without affecting the operation of the elevator.

The jointed elevator-frame serves as a means of holding the main frame A in substantially a horizontal position, supported by the axle, and the platform-frame A² in proper relative position without interfering with the independent vertical adjustment of the platform-frame A² in respect to the main frame.

The platform-frame A² is prevented from tipping when in operation by reason of the connection of the pole B through lever S with the frame A' and by the connection of the frames A and A² by the jointed elevator-frame M and lever E, both levers being under the control of the driver.

The grain may be elevated by the usual slatted or toothed bands. I prefer, however, to employ the device illustrated in Figs. 1 and 8, in which device the frame M has a closed platform provided with a series of upwardly-inclined teeth, $e$, and the grain is carried upward over the platform and its teeth by the action of toothed blades O O', operated by the cranks P P' of the crank-shaft, turning in standards $m$ upon the frame M and driven by means of chains $r^2$ $y$, the sprocket-wheels and the gears $n'$ $r'$ from a shaft, $n$, turning in the standards $k$ $k$. The shaft $n$ and a parallel shaft, $n'$, coincide with the joints of the upper part of the elevator-frame and carry rollers Q Q', around which pass endless toothed bands Q². The shaft $n$ is driven in the direction of its arrow, Fig. 1, by a chain, $r$, passing around a sprocket-wheel, $n^2$, on the shaft and around a sprocket-wheel, $n^3$, upon a shaft, R, carried in bearings or the main frame A and driven from the wheel C through the medium of gears $p$ $p'$, as shown in Figs. 2 and 4. The revolution of the cranks P P' carries the toothed blades O O' alternately in an upward direction over the face of the platform of the frame M, the teeth $s$ of the blades lifting the grain upward and the teeth $e$ upon the platform preventing it moving downward, so that it is gradually carried to the traveling bands Q² and over the wheels at the outside of the machine to the binder. The movement of the shaft R is of course not materially affected by any change in the position of the main frame A, nor do the connecting chains or belts and gears ever alter their relative position in consequence of any change of position of the frames M M', so that the movement of the elevating devices and the delivery of the grain cannot be materially affected by the changes incident to passing over uneven ground or the elevation or depression of the platform-frame A². The height of the cut is regulated by raising or lowering the platform-frame A², and the angle of the latter is altered by vibrating a lever, S, pivoted to the pole B and connected by a link, $t$, to the frame A'.

It will be apparent that the connecting-frame A', when hung as described, permits uniform motion to be communicated from the drive wheel to the cutter-bar regardless of the relative positions of the frames.

One important advantage of the construction above set forth is that the binder is not carried up and down with the platform. Thus the binder at W³ is supported upon the main frame A in the position shown in Fig. 1 and remains relatively stationary while the platform is raised and lowered. In like manner the driver's seat is supported by the pole, as above described, so that it does not move with the frame A².

It will be evident that some features of my invention may be used alone separate from the other features.

I do not limit myself to the precise construction of parts shown and described, but claim—

1. In a harvester, the combination, with the main frame carried by a single driving-wheel and occupying a fixed position in respect to the same, of a platform-frame extending laterally from said main frame and wheel, and an intermediate frame composed of two arms pivotally mounted at one end upon the axle of the driving-wheel, one upon each side thereof, and pivotally connected at their opposite ends in front of said wheel to the platform-frame, substantially as set forth.

2. In a harvester, the combination, with the main frame carried by a single driving-wheel and occupying a fixed position in respect to the same, of a platform-frame extending laterally from said main frame and wheel, and an intermediate frame composed of two arms pivotally mounted at one end upon the axle of the driving-wheel, one upon each side thereof, and pivotally connected at their opposite ends in front of said wheel to the platform-frame, and levers E and S, for adjusting the position of the platform and intermediate frames, substantially as described.

3. The combination, with the main frame, the platform-carrying frame, and means for varying the height of said platform-frame in respect to the main frame, of a jointed elevator-frame pivoted at one end to the platform-carrying frame and at the other end to the main frame and extending over the drive-wheel, substantially as described.

4. The combination of the axle, the main frame mounted in a fixed position with relation to the axle, platform-carrying frame, connecting-frame, and jointed elevator-frame connecting the main frame and platform-carrying frame, substantially as described.

5. The combination of the main frame mounted in a fixed position with relation to the axle, the axle, the platform-carrying frame, an intermediate connecting-frame pivoted upon the axle, a cutter-bar carried by the platform-carrying frame, an actuating-wheel revolving upon the axis upon which the connecting-frame swings, and mechanism, substantially as described, for transmitting motion from said wheel to the cutter-bar, substantially as described.

6. The combination of the main frame mounted in a fixed position with relation to the axle, the axle, the platform-frame, intermediate connecting-frame pivoted upon the axle, the cutter-bar, the bell-crank lever pivoted adjacent to the joint between the platform-frame and the connecting-frame, the crank-wheel turning on the axis of the connecting-frame, and means connecting the said bell-crank lever to the crank-wheel and to the cutter-bar, substantially as described.

7. The combination, with the drive-wheel, main frame mounted in a fixed position with relation to the axle, platform-carrying frame, and connecting-frame pivoted on the axle, of the cutter-bar, gears 3 4 J I, crank-wheel $f^2$, bell-crank lever H, and connecting-rods $f f'$, substantially as described.

8. The combination, with the main frame mounted in a fixed position with relation to the axle, axle, platform-carrying frame, connecting-frame pivoted on the axle, and jointed elevator-frame connecting the main frame and platform-frame, of rollers having journals coinciding with the joints of the elevator-frame, and connections, substantially as described, whereby movement is communicated from the drive-wheel to the roller on the main frame and from the latter to the next roller, substantially as described.

9. The combination of the main frame mounted in a fixed position with relation to the axle, the axle, the platform-frame jointed thereto, the cutter-bar, the driving-gear, and the bell-crank lever having its pivot adjacent to the joint of the platform-frame, and connecting means whereby said lever communicates motion from the driving-gear to the cutter-bar, substantially as described.

10. The combination of the main frame, the platform-frame, the swinging connecting-frame, and grain-elevating appliances supported by a frame composed of two parts jointed together, one held to standards upon the said main frame and the other by said platform-frame, substantially as described.

11. The combination of the main frame, swinging connecting-frame, platform-frame, and jointed elevator-frame provided with rollers carrying aprons, one of said rollers carrying a sprocket-wheel, around which passes a chain to a sprocket-wheel upon a shaft coincident with the outer joint of the elevator-frame, substantially as described.

In testimony whereof I have signed my name to this specification in the presence of two subscribing witnesses.

SAMUEL D. MADDIN.

Witnesses:
AMOS K. CLAY,
ADAM CLAY.